United States Patent
He (10) Patent No.: US 12,471,023 B2
(45) Date of Patent: Nov. 11, 2025

(54) RESOURCE DETERMINATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 398 days.

(21) Appl. No.: 18/068,596

(22) Filed: Dec. 20, 2022

(65) Prior Publication Data

US 2023/0117840 A1 Apr. 20, 2023

Related U.S. Application Data

(63) Continuation of application No. PCT/CN2020/116751, filed on Sep. 22, 2020.

(51) Int. Cl.
*H04W 52/02* (2009.01)
*H04W 68/02* (2009.01)

(52) U.S. Cl.
CPC ....... *H04W 52/0232* (2013.01); *H04W 68/02* (2013.01)

(58) Field of Classification Search
CPC ............. H04W 52/0232; H04W 68/02; H04W 52/0216; H04W 52/0235; H04W 68/025; H04W 72/232; H04W 72/0446; Y02D 30/70
See application file for complete search history.

(56) References Cited

U.S. PATENT DOCUMENTS

| | | | |
|---|---|---|---|
| 2020/0107267 A1 | 4/2020 | Wu et al. | |
| 2020/0275375 A1* | 8/2020 | Liu | H04W 52/0216 |

FOREIGN PATENT DOCUMENTS

| | | | | |
|---|---|---|---|---|
| CN | 106063319 A | | 10/2016 | |
| CN | 109600832 A | * | 4/2019 | .......... H04J 11/0069 |
| CN | 109803376 A | | 5/2019 | |
| CN | 11053684 A | | 12/2019 | |

(Continued)

OTHER PUBLICATIONS

Machine translated to English version of CN 109600832, retrieved from PE2E on Mar. 18, 2025. (Year: 2019).*

(Continued)

*Primary Examiner* — Charles C Jiang
*Assistant Examiner* — Rachel Elizabeth Marks
(74) *Attorney, Agent, or Firm* — PERKINS COIE LLP (57) ABSTRACT

The present application relates to a resource determination method, a terminal device, and a network device. The resource determination method comprises: a terminal device determining a time interval between a time-domain resource and a paging resource of an energy saving signal; and on the basis of the time interval, the terminal device determining a time-domain resource for detecting the energy saving signal. According to the embodiments of the present application, by means of determining a time interval between a time-domain resource and a paging resource of an energy saving signal, a terminal device can correctly receive the energy saving signal.

13 Claims, 5 Drawing Sheets

200

A terminal device determines a time interval between a time domain resource of a power saving signal and a paging resource — S210

The terminal device determines a time domain resource for detecting the power saving signal based on the time interval — S220

(56) References Cited

FOREIGN PATENT DOCUMENTS

| | | | | |
|---|---|---|---|---|
| CN | 110536383 A | 12/2019 | | |
| CN | 110536384 A | 12/2019 | | |
| CN | 110839214 A | 2/2020 | | |
| CN | 111315002 A | 6/2020 | | |
| CN | 111343717 A | 6/2020 | | |
| KR | 20200106194 A | * | 9/2020 | .......... H04W 68/025 |
| WO | 2020156317 A1 | 8/2020 | | |

OTHER PUBLICATIONS

Machine translated to English version of KR 20200106194, retrieved from PE2E on Mar. 18, 2025. (Year: 2020).*

Machine translated to English KR 20200106194A. Retrieved from PE2E on Jul. 11, 2025. (Year: 2020).*

First Office Action of the Chinese application No. 202310407675.7, issued on Jul. 11, 2024. 17 pages with English translation.

3GPP "Evolved Universal Terrestrial Radio Access (E-UTRA); User Equipment (UE) procedures in idle mode (Release 15)" 3GPP TS 36.304 V15.6.0 (Jul. 2020). 3GPP TSG-RAN. 55 pages.

European search report of the European application No. 20954347.9, issued on Jun. 19, 2023, 9 pages.

International Search Report Mailed Jun. 23, 2021 in Application No. PCT/CN2020/116751.

Written Opinion Mailed Jun. 24, 2021 in N Application No. PCT/CN2020/116751.

3GPP TS 38.212 V16.1.0 (Mar. 2020), 3rd Generation Partnership Project; Technical Specification Group Radio Access Network; NR; Multiplexing and channel coding, 141 pages.

3GPP TS 38.213 V16.2.0 (Jun. 2020), 3rd Generation Partnership Project; Technical Specification Group Radio Access Network; NR; Physical layer procedures for control, 176 pages.

3GPP TS 38.331 V16.0.0 (Mar. 2020), 3rd Generation Partnership Project; Technical Specification Group Radio Access Network; NR; Radio Resource Control (RRC) protocol specification, 832 pages.

LG Electronics, Discussion on UE-grouping wake up signal in MTC, 3GPP TSG RAN WG1 #97, R1-1906681, Reno, USA, May 13-17, 2019, 6 pages.

LG Electronics, Discussion on UE-grouping wake up signal in NB-IoT, 3GPP TSG RAN WG1 #97, R1-1906690, Reno, USA, May 13-17, 2019, 6 pages.

Examination report of the European application No. 20954347.9, issued on Dec. 14, 2023. 8 pages.

Notification to Grant an Invention Patent of the Chinese application No. 202310407675.7, issued on Sep. 30, 2024. 5 pages with English translation.

R3-201676,3GPP TSG-RAN WG3 Meeting#107bis-e,E-Meeting, Apr. 20-30, 2020,Huawei, Vodafone, "Consideration on UE group wake up signal (WUS)". 12 pages.

* cited by examiner

RESOURCE DETERMINATION METHOD, TERMINAL DEVICE, AND NETWORK DEVICE

CROSS-REFERENCE TO RELATED APPLICATION

This application is a continuation application of International Application No. PCT/CN2020/116751, filed on Sep. 22, 2020, the entire disclosure of which is hereby incorporated by reference.

TECHNICAL FIELD

The present application relates to the field of communication, and more particularly, to a resource determination method, a terminal device, and a network device.

BACKGROUND

In order to reduce power consumption of a terminal, Long Term Evolution (LTE) and New Radio (NR) systems include a Discontinuous Reception (DRX) mechanism. The DRX mechanism enables the terminal to enter a discontinuous receiving state without turning on a receiver all the time in a case that there is no data reception, thus achieving a purpose of saving power.

In order to achieve further power saving, a power saving signal is introduced. For an idle User Equipment (UE), a power saving signal may be used for indicating whether the UE receives paging at a reached Paging Occasion (PO). It is necessary to consider how to receive the power saving signal correctly.

SUMMARY

Implementations of the present application provide a resource determination method, a terminal device, and a network device, which may correctly receive a power saving signal.

An implementation of the present application provides a resource determination method, including: determining, by a terminal device, a time interval between a time domain resource of a power saving signal and a paging resource; and determining, by the terminal device, a time domain resource for detecting the power saving signal based on the time interval.

An implementation of the present application provides a resource determination method, including: sending, by a network device, a time interval between a time domain resource of a power saving signal and a paging resource; wherein the time interval is used for instructing a terminal device to determine a time domain resource for detecting the power saving signal.

An implementation of the present application provides a terminal device, which includes: a first determination unit, used to determine a time interval between a time domain resource of a power saving signal and a paging resource; and a second determination unit, used to determine a time domain resource for detecting the power saving signal based on the time interval.

An implementation of the present application provides a network device, which includes: a sending unit, used to send a time interval between a time domain resource of a power saving signal and a paging resource; wherein the time interval is used for instructing a terminal device to determine a time domain resource for detecting the power saving signal.

An implementation of the present application provides a terminal device, which includes a processor and a memory. The memory is used to store a computer program, and the processor is used to call and run the computer program stored in the memory to enable the terminal device to perform the above resource determination method.

An implementation of the present application provides a network device, which includes a processor and a memory. The memory is used to store a computer program, and the processor is used to call and run the computer program stored in the memory to enable the network device to perform the above resource determination method.

An implementation of the present application provides a chip, which is used to implement the above resource determination method.

Specifically, the chip includes a processor, used to call and run a computer program from a memory, so that a device installed with the chip is enabled to perform the above resource determination method.

An implementation of the present application provides a computer readable storage medium, which is used to store a computer program, wherein when the computer program is run by a device, the device is enabled to perform the above resource determination method.

An implementation of the present application provides a computer program product, which includes computer program instructions, wherein the computer program instructions enable a computer to perform the above resource determination method.

An implementation of the present application provides a computer program which, when run on a computer, enables the computer to perform the above resource determination method.

According to an implementation of the present application, a time interval between a time domain resource of a power saving signal and a paging resource is determined, so that a terminal device may correctly receive the power saving signal.

DETAILED DESCRIPTION

Technical solutions in the implementations of the present application will be described below in combination with accompanying drawings in the implementations of the present application.

Technical solutions according to implementations of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-generation (5G) communication system, or another communication system, etc.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the implementations of the present application may be applied to these communication systems as well.

The implementations of the present application may also be applied to these communication systems.

Optionally, the communication systems in the implementations of the present application may be applied to a Carrier Aggregation (CA) scenario, or a Dual Connectivity (DC) scenario, or a Standalone (SA) network deployment scenario.

Optionally, the communication system in an implementation of the present application may be applied to an unlicensed spectrum, wherein the unlicensed spectrum may also be considered as a shared spectrum; or, the communication system in the implementation of the present application may also be applied to a licensed spectrum, wherein the licensed spectrum may also be considered as a non-shared spectrum.

Various implementations of the present application are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in a WLAN, or a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a terminal device in a next generation communication system, e.g., an NR network, or a terminal device in a future evolved Public Land Mobile Network (PLMN), etc.

In an implementation of the present application, a terminal device may be deployed on land including indoor or outdoor, handheld, wearable or vehicle-mounted terminal device; or it may be deployed on water (such as on ships, etc.); or it may be deployed aerially (such as in airplanes, balloons and satellites, etc.).

In an implementation of the present application, the terminal device may be a mobile phone, a Pad, a computer with wireless transceiving function, a Virtual Reality (VR) terminal device, an Augmented Reality (AR) terminal device, a wireless terminal device in industrial control, a wireless terminal device in self-driving, a wireless terminal device in remote medicine, a wireless terminal device in smart grid, a wireless terminal device in transportation safety, a wireless terminal device in smart city, or a wireless terminal device in smart home, etc.

As an example rather than limitation, in the implementations of the present application, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices such as a smart watch or smart glasses, which are fully functional, have large sizes, and may implement complete or partial functions without relying on smart phones, and devices such as various smart bracelets, smart jewelries or the like for monitoring physical signs, which focus on a certain kind of application functions only and need to be used in conjunction with other devices such as smart phones.

In an implementation of the present application, the network device may be a device used for communicating with a mobile device, and may be an Access Point (AP) in the WLAN, a Base Transceiver Station (BTS) in GSM or CDMA, a NodeB (NB) in WCDMA, an evolutional Node B (eNB or eNodeB) in LTE, a relay station or an access point, a vehicle-mounted device, a wearable device, a network device (gNB) in the NR network, a network device in a future evolved PLMN network, or a network device in an NTN network, etc.

As an example rather than limitation, in an implementation of present application, the network device may be of mobility, for example, the network device may be a mobile device. Optionally, the network device may be a satellite or a balloon station. For example, the satellite may be a Low Earth Orbit (LEO) satellite, a Medium Earth Orbit (MEO)

satellite, a Geostationary Earth Orbit (GEO) satellite, a High Elliptical Orbit (HEO) satellite, etc. Optionally, the network device may be a base station disposed in a position on land or a water region etc.

In an implementation of the present application, the network device may provide a service for a cell, and the terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

Figure 1:
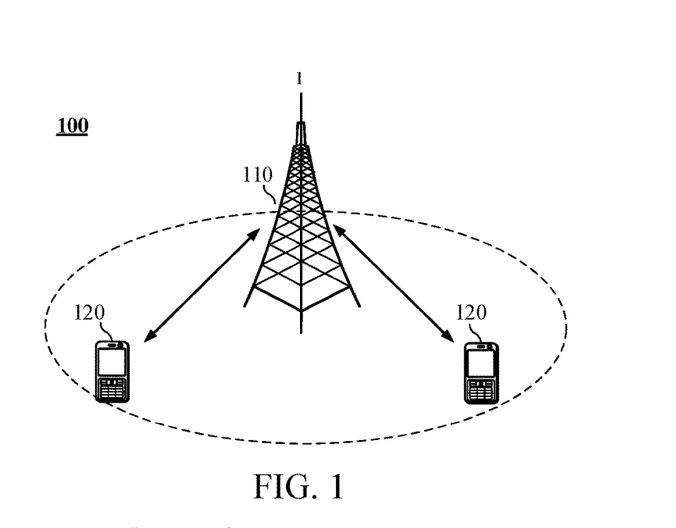
FIG. 1 is a schematic diagram of an application scenario according to an implementation of the present application.

FIG. 1 schematically shows a communication system 100. The communication system includes a network device 110 and two terminal devices 120. Optionally, the communication system 100 may include multiple network devices 110, and a coverage area of each network device 110 may include another quantity of terminal devices 120, which is not limited in the implementations of the present application.

Optionally, the communication system 100 may further include another network entity such as a Mobility Management Entity (MME), and an Access and Mobility Management Function (AMF), which is not limited in the implementations of the present application.

The network device may also include an access network device and a core network device. That is, a wireless communication system also includes multiple core networks that communicate with the access network device. The access network device may be an evolutional node B (eNB or e-NodeB) macro base station, a micro base station (also referred to as a "small base station"), a pico base station, an Access Point (AP), a Transmission Point (TP), or a new generation Node B (gNodeB) in a Long-Term Evolution (LTE) system, a next-generation (mobile communication system) Next Radio (NR) system, or an authorized Auxiliary Access Long-Term Evolution (LAA-LTE) system.

It should be understood that a device with a communication function in a network/system in the implementations of the present application may also be referred to as a communication device. Taking the communication system shown in FIG. 1 as an example, a communication device may include a network device and terminal devices which have communication functions, and the network device and the terminal devices may be specific devices in the implementations of the present application, and will not be repeated herein. The communication device may also include another device in the communication system, for example, another network entity such as a network controller and a mobility management entity, which is not limited in the implementations of the present application.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "/" herein generally indicates that objects before and after the symbol "/" have an "or" relationship.

It should be understood that "indication" involved in implementations of the present application may be a direct indication, may be an indirect indication, or may represent an association relationship. For example, that A indicates B may mean that A indicates B directly, for example, B may be acquired through A; or it may mean that A indicates B indirectly, for example, A indicates C, and B may be acquired through C; or it may mean that there is a correlation between A and B.

In the description of the implementations of the present application, the term "correspond" may mean that there is a directly corresponding or an indirectly corresponding relationship between two parties, or mean that there is an association between two parties, or mean a relationship such as indicating and being indicated, configuring and being configured, etc.

In order to facilitate understanding of technical solutions of the implementations of the present application, the related art of the implementations of the present application are described below, and as alternative solutions, the following related art may be arbitrarily combined with the technical solutions of the implementations of the present application, which should be subject to the protection scope of the implementations of the present application.

A mechanism of DRX includes configuring a DRX cycle for a UE in a Radio Resource Control (RRC) CONNECTED state. One DRX cycle includes "On Duration" and "Opportunity for DRX". During "On Duration" time, the UE monitors and receives a downlink channel including a Physical Downlink Control Channel (PDCCH) and a signal. During "Opportunity for DRX" time, the UE does not receive a downlink channel such as a PDCCH or a signal to reduce power consumption. The UE in an RRC IDLE state needs to receive a paging message in a manner similar to DRX. There is one Paging Occasion (PO) in one DRX cycle, and the UE only receives a paging message at the PO, but does not accept a paging message at times other than the PO, so as to achieve a purpose of saving power. During the PO, the UE determines whether there is a paging message by detecting a PDCCH signal scrambled through a Paging-Radio Network Temporary Identity (P-RNTI).

In evolution of 5G, higher requirements are put forward for power saving of a UE. For example, for a DRX mechanism, during each On Duration, a UE needs to constantly detect a PDCCH to determine whether a base station schedules data transmission to itself. However, for most UEs, there may be no need to receive data transmission for a long time, but it is still necessary to maintain a regular wake-up mechanism to monitor possible downlink transmission. For such UEs, there is room for further optimization of power saving. It is similar for a UE receiving a paging message in an RRC IDLE state.

Figure 2:
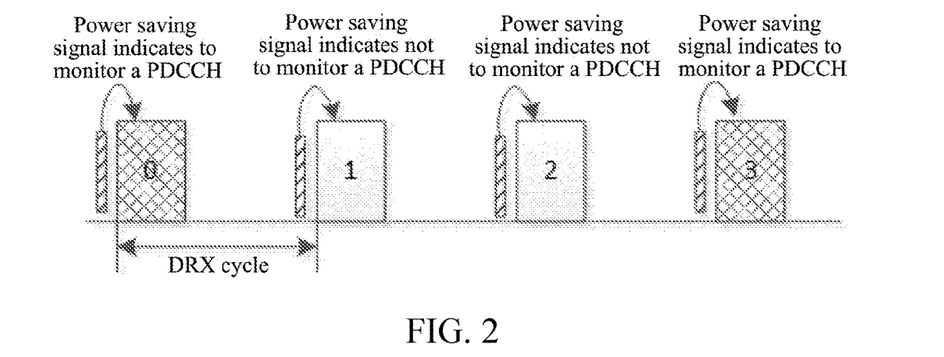
FIG. 2 is a schematic diagram of indicating whether to monitor a Physical Downlink Control Channel (PDCCH) through a power saving signal.

In order to further achieve power saving, a power saving signal is introduced. The power saving signal is used in conjunction with a DRX mechanism, and a terminal receives an indication of the power saving signal before DRX On Duration. Exemplarily, the power saving signal may also be referred to as a power saving wake-up signal. When the terminal has data to be transmitted during one DRX cycle, the power-saving signal "wakes up" the terminal to monitor a PDCCH during the DRX On duration. Otherwise, when the terminal has no data to be transmitted during one DRX cycle, the power saving signal does not "wake up" the terminal, and the terminal does not need to monitor a PDCCH during the DRX On Duration. Compared with a single DRX mechanism, when a terminal has no data to be transmitted, the terminal may omit PDCCH monitoring during DRX On duration, thus achieving power saving. Time of the terminal outside the DRX On Duration is referred to as inactive time, and time during the DRX On Duration is referred to as active time. A process of indicating, through a power saving signal, whether a terminal monitors a PDCCH during DRX On Duration, is as shown in FIG. 2.

Figure 3:
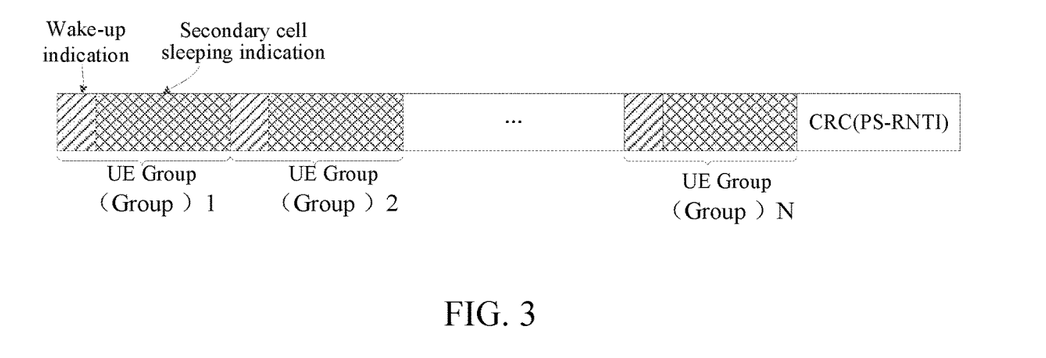
FIG. 3 is a schematic diagram of a power saving signal carrying multi-user power saving indication information.

Exemplarily, the power saving signal may be carried through Downlink Control Information (DCI) format 2_6. A network configures the terminal to detect a search space set of a PDCCH carrying DCI format 2_6. For example, in a power saving signal, a quantity of bits required by a single user is up to 6. Among them, it includes 1 wake-up indication bit and up to 5 secondary cell sleeping indication bits. The power saving signal carries indication bits of multiple users to improve resource utilization efficiency. As shown in FIG. 3, a power saving signal may carry multi-user power saving indication information. A network notifies a starting position of power saving indication bits of each user in DCI, and a quantity of bits of a single user may be implicitly obtained from a configured quantity of secondary cell (carrier) groups (wake-up indication bits must appear, and a quantity of secondary cell (carrier) sleeping indication bits may be 0). Further, the network also notifies a terminal of a total number of bits of the DCI and a Power Saving (PS)-RNTI scrambling a PDCCH.

There is a certain timing relationship between a monitoring occasion of the PDCCH and a time window of DRX On Duration (abbreviated as DRX ON). The network configures a time offset (for example, a PS-offset) to determine a start point of the monitoring occasion of the PDCCH. After determining the start point of the monitoring occasion of the PDCCH, it is necessary to further determine an end point of PDCCH monitoring. The end point of the PDCCH monitoring may be determined by a device capability of the terminal. The terminal needs to perform operations such as device wake-up and initialization after wake-up within a minimum time interval before DRX ON, so the terminal does not need to monitor a power saving signal within the minimum time interval before DRX ON. A shorter minimum time interval may be used for a terminal with a higher processing speed, as shown value 1 in Table 1 below, and a longer minimum time interval may be used for a terminal with a lower processing speed, as shown in value 2 in Table 1.

TABLE 1

| Sub-carrier space | Minimum time interval | |
|---|---|---|
| | Minimum time interval (slots) | |
| (kHz) | Value 1 | Value 2 |
| 15 | 1 | 3 |
| 30 | 1 | 6 |
| 60 | 1 | 12 |
| 120 | 2 | 24 |

Figure 4:
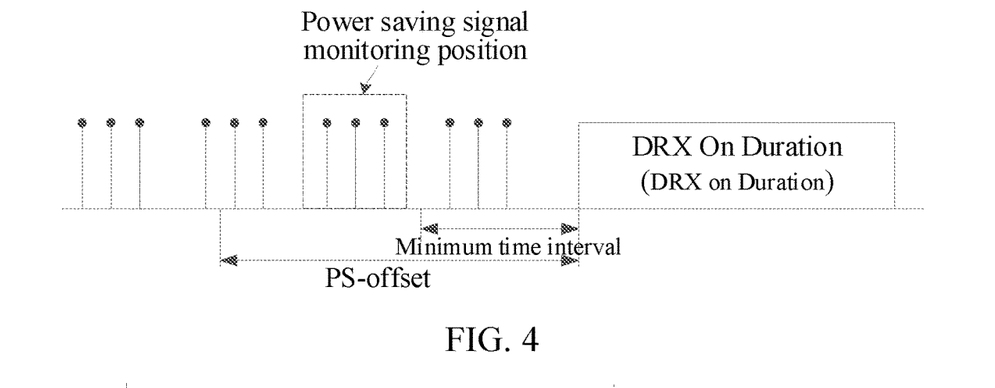
FIG. 4 is a schematic diagram of a monitoring occasion of a power saving signal.

The power saving signal starts at a time position indicated by a PS-offset configured by the network and is monitored within one complete PDCCH search space period (e.g., defined by a parameter "duration" of PDCCH search space) after the start point, and a position of the monitored power saving signal is prior to a time period corresponding to a minimum time interval. As shown in FIG. 4, a terminal monitors a monitoring occasion of a power saving signal indicated by a dashed box.

In an NR system, a network may send paging to a UE in an IDLE state and an RRC-CONNECTION state. A paging process may be triggered by a core network or a base station, and it is used for sending a paging request to the UE in the idle state, or used for notifying system information update, or notifying the UE to receive an Earthquake and Tsunami Warning System (ETWS), a Commercial Mobile Alert System (CMAS), and other information. After receiving the paging message of the core network, the base station interprets contents thereof, obtains a list of Tracking Area Identities (TAIs) of the UE, and performs air interface paging in a cell belonging to a tracking area in the list under the base station. A core network domain of the paging message is not decoded at the base station, but transmitted to the UE transparently. After receiving the paging message from the core network, the base station aggregates paging messages of UEs with a same Paging Occasion (PO) into one paging message, and transmits the paging message to related UEs through a paging channel. A UE receives a paging parameter through a system message, calculates a PO in combination with its own UE_ID, and receives a paging message at corresponding time. The paging message is carried through a Physical Downlink Shared Channel (PDSCH). The UE obtains paging indication information by detecting a PDCCH scrambled with a P-RNTI, and thus receives the paging message. A UE in an idle state will save power by means of DRX, and the UE obtains DRX related information from System Information Block 2 (SIB2). The UE monitors a PDCCH scrambled by a P-RNTI at a PO on a Paging Frame (PF) in one DRX cycle to receive a paging message.

The PF indicates which system frame number the paging message should appear on, and the PO indicates time when it is possible to appear. One PF frame may include one or more POs. For every DRX cycle or Paging Cycle, the UE only needs to monitor its own PO. A System Frame Number (SFN) that satisfies a following formula may be used as a PF.

(SFN+PF_offset)mod $T=(T$ div $N)*($UE_ID mod $N)$

Within the PF, an index of a PO corresponding to UE_ID may be calculated according to a following formula, that is, i_s.

i_s=floor(UE_ID/$N$)mod $Ns$

Figure 5:
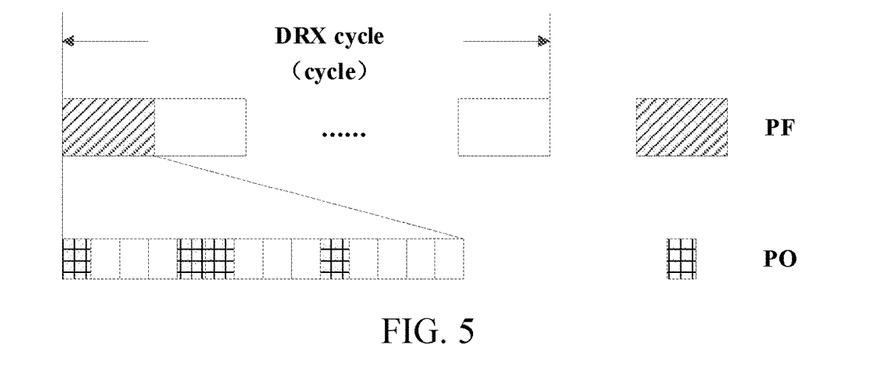
FIG. 5 is a schematic diagram of a Paging Frame (PF) and a PO.

In the above formula, SFN is a system frame number and UE_ID is a UE identity. mod represents modulo operation, and div represents divisible operation. floor ( ) represents rounding down. T represents a DRX cycle of the UE. T=min (T_ue, T_sib) if a default DRX cycle indicated in a system message is recorded as T_sib and if a DRX value T_ue of the UE has been configured; if T_ue is not configured, a default value T=T_sib indicated in a system message is used. UE_ID=(5G-S-TMSI mod 1024). N is a quantity of PFs in T. Ns is a quantity of POs in one PF. PF_offset is a frame offset used for determining a PF. For example, as shown in FIG. 5, it is a position of a PF within one DRX cycle and a position of a PO within the PF.

SS/PBCH block (SSB) transmission of NR is described below.

Common channels and signals such as synchronization signals and broadcast channels in a NR system need to cover the whole cell by way of multi-beam scanning, which facilitates receiving of UEs in the cell. Multi-beam transmission of a Synchronization Signal (SS) is achieved by defining a SS/PBCH burst set. One SS/PBCH burst set contains one or more SS/PBCH blocks. One SS/PBCH block is used for carrying a synchronization signal and a broadcast channel of one beam. Thus, one SS/PBCH burst set may contain synchronization signals of up to L beams within a cell. L is related to a frequency band of a system, for example:

for frequency range up to 3 GHz (gigahertz), L is 4; for frequency range from 3 GHz to 6 GHz, L is 8; for frequency range from 6 GHz to 52.6 GHz, L is 64.

One SS/PBCH block (SSB) contains a Primary Synchronization Signal (PSS) of one symbol, a Secondary Synchronization Signal (SSS) of one symbol, and a Physical broadcast channel (PBCH) of two symbols. A Demodulation Reference Signal (DMRS) is contained in a time frequency resource occupied by the PBCH for demodulation of the PBCH.

For example, all SS/PBCH blocks in a SS/PBCH burst set are sent within a 5 ms (millisecond) time window and are repeatedly sent in a certain period. The period may be configured through a high-layer parameter such as ssb-PeriodicityServingCell (SSB Periodicity Service Unit), and the period may include 5 ms, 10 ms, 20 ms, 40 ms, 80 ms, 160 ms, and so on.

At present, a power saving signal needs to take a time position indicated by a Power Saving signal offset (PS-offset) configured by a network as a start point, and the power saving signal is monitored within one complete PDCCH search space period (defined by a parameter "duration" of PDCCH search space) after the start point, and an interval between a position of the monitored power saving signal and a starting position of DRX On duration needs to meet a minimum time interval. The minimum time interval only needs to consider a processing capability of a UE, and it does not need to consider time-frequency synchronization of the UE before arrival of the DRX On duration, so that a PDCCH may be correctly received during the DRX On duration. The reason is that, for a UE in a connected state, time-frequency synchronization may be performed by a configured reference signal such as a Channel-State Information Reference Signal (CSI-RS) and a Time Reference Signal (TRS). For a UE in an idle state, a power saving signal may be used for indicating whether the UE receives paging on a reached PO. Since the UE in the idle state is not configured with a reference signal such as a CSI-RS or a TRS, the time-frequency synchronization may only be performed by using a periodically transmitted Synchronization Signal/Physical Broadcast Channel (PBCH) block (Synchronization Signal Block (SSB) for short). A current minimum time interval cannot meet a purpose of time-frequency synchronization performed through a SSB before arrival of a PO, which leads to incorrect reception of paging.

Figure 6:
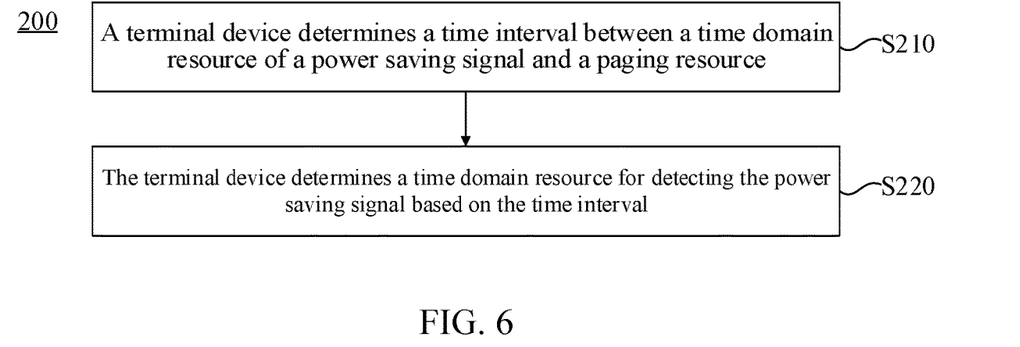
FIG. 6 is a schematic flowchart of a resource determination method according to an implementation of the present application.

FIG. 6 is a schematic flowchart of a resource determination method 200 according to an implementation of the present application. The method may optionally be applied to the system shown in FIG. 1, but is not limited thereto. The method includes at least portion of following contents.

In S210, a terminal device determines a time interval between a time domain resource of a power saving signal and a paging resource.

In S220, the terminal device determines a time domain resource for detecting the power saving signal based on the time interval.

Exemplarily, a terminal device can perform time-frequency synchronization with a network through a SSB prior to arrival of a paging resource, such as a PO, during a time interval between a time domain resource and the paging resource.

Optionally, in the implementation of the present application, the paging resource includes a Paging Occasion (PO) and/or a Paging Frame (PF). The PF indicates which system frame number a paging message should appear on, and the PO indicates time when it is possible to appear. Examples of a PO and a PF may be seen in FIG. 5. When the terminal device is in an RRC idle state or inactive state, it may determine a monitoring occasion for detecting a PDCCH according to its own PF and PO, and it may carry out DRX at other times to achieve a purpose of saving electricity and energy.

Optionally, in the implementation of the present application, the terminal device determines the time interval between the time domain resource of the power saving signal and the paging resource, including: the terminal device receives configuration information including a first time interval.

Specifically, the terminal device may receive configuration information from a network device. Exemplarily, the configuration information may be configured through an RRC signaling, indicated through a system message, or indicated through DCI carried by a PDCCH.

Optionally, in the implementation of the present application, the terminal device determines the time interval between the time domain resource of the power saving signal and the paging resource, further including: the terminal device determines a minimum time interval between the time domain resource of the power saving signal and the paging resource based on the first time interval.

In one example, the terminal device may directly take the first time interval in configuration information as a minimum time interval between the time domain resource of the power saving signal and the paging resource.

Optionally, in the implementation of the present application, the terminal device determines the time interval between the time domain resource of the power saving signal and the paging resource, including: the terminal device determines a second time interval based on a terminal capability; the terminal device determines a minimum time interval between the time domain resource of the power saving signal and the paging resource based on a maximum value of the first time interval and the second time interval.

In an example, after receiving configuration information, the terminal device may acquire a first time interval T1 from the configuration information, then determine a second time interval T2 based on its own terminal capability, and then take a maximum value of T1 and T2 as a minimum time interval between the time domain resource of the power saving signal and the paging resource.

Optionally, in the implementation of the present application, the minimum time interval between the time domain resources and the paging resources of the power saving signal is a predefined value. For example, a minimum time interval between a time domain resource of a power saving signal and a PO of a UE is a predefined value. For another example, a minimum time interval between a time domain resource of a power saving signal and a PF of a UE is a predefined value.

Optionally, in the implementation of the present application, the minimum time interval is a predefined value determined based on a requirement for time-frequency synchronization recovery.

Optionally, in the implementation of the present application, the minimum time interval is a predefined value determined based on a sub-carrier space.

Optionally, in the implementation of the present application, the minimum time interval between the time domain resource of the power saving signal and the paging resource is determined based on a predefined rule.

Optionally, in the implementation of the present application, the predefined rule includes calculating and obtaining the minimum time interval using at least one of following parameters: a transmission period of a SSB; a sub-carrier space; a terminal capability; and a transmission period of a reference signal.

Exemplarily, a minimum time interval may be predefined to be N times of a transmission period of a SSB, N may be equal to 1, 2, 3, etc., and N may depend on a quantity of SSBs that a UE needs to receive to complete time-frequency synchronization recovery within the minimum time interval. If the transmission period T of the SSB is obtained by the UE from a system message or an RRC signaling, the minimum time interval may be T*N. In addition, combined with different sub-carrier spaces, a minimum time interval may also be determined according to different rules, referring to Table 2.

TABLE 2

Minimum time interval

| Sub-carrier space (kHz) | Minimum time interval (slots) |
|---|---|
| 15 | T*N |
| 30 | 2*T*N |
| 60 | 4*T*N |
| 120 | 8*T*N |

Exemplarily, the terminal capability may include a terminal processing capability such as terminal processing time. In addition, time for a terminal to perform time-frequency recovery may also be regarded as a terminal capability.

Exemplarily, a reference signal may include, for example, a CSI-RS, a TRS, and a Phase Tracking Reference Signal (PTRS). If time-frequency recovery is performed through the reference signal, the above-mentioned minimum time interval may also be calculated and obtained according to a period of the reference signal.

Optionally, in the implementation of the present application, the terminal device determines the time domain resource for detecting the power saving signal based on the time interval, including: the terminal device determines an end point of a time interval where the time domain resource for detecting the power saving signal is located based on a minimum time interval between the time domain resource and a paging resource.

Optionally, in the implementation of the present application, the method further includes: the terminal device determines a start point of a time interval where the time domain resource for detecting the power saving signal is located based on an offset. For example, the terminal device determines the start point of the time domain resource for detecting the power saving signal based on a Power Saving signal offset (PS-offset), as shown in FIG. 4. The time domain resource of the power saving signal is within a range of a time interval from the start point to the end point.

Optionally, in the implementation of the present application, the method further includes: the terminal device is not required to monitor the power saving signal within the minimum time interval between the time domain resource and the paging resource.

Optionally, in the implementation of the present application, the power saving signal is used for indicating whether the terminal device monitors a paging message at the PO and/or the PF.

Exemplarily, in a case that the power saving signal is used for instructing the terminal device to monitor a paging message at the PO and/or the PF, the terminal device performs recovery of time-frequency synchronization through a SSB during the minimum time interval. In a case that the power saving signal is used for instructing the terminal device not to monitor a paging message at the PO and/or the PF, the terminal device does not perform recovery of time-frequency synchronization within the minimum time interval.

Optionally, in the implementation of the present application, a unit of the time interval is at least one of following: a slot, a subframe, a symbol, a millisecond, and a period of a SSB.

In the implementation of the present application, a time interval between a time domain resource of a power saving signal and a paging resource is determined, so that the terminal device may have enough time to carry out time-frequency synchronization after correctly receiving the power saving signal, thus correctly receiving paging.

Figure 7:
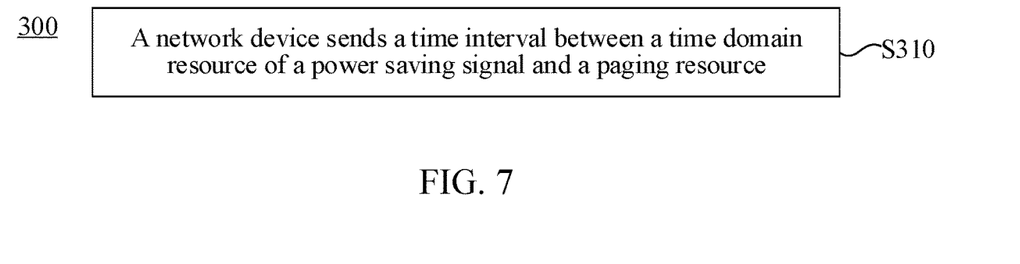
FIG. 7 is a schematic flowchart of a resource determination method according to another implementation of the present application.

FIG. 7 is a schematic flowchart of a resource determination method 300 according to an implementation of the present application. The method may optionally be applied to the system shown in FIG. 1, but is not limited thereto. The method includes at least portion of following contents.

In S310, a network device sends a time interval between a time domain resource of a power saving signal and a paging resource.

The time interval is used for instructing a terminal device to determine a time domain resource for detecting the power saving signal.

Optionally, in the implementation of the present application, the network device sends the time interval between the time domain resource of the power saving signal and the paging resource, including: the network device sends configuration information including a minimum time interval between the time domain resource of the power saving signal and the paging resource, and the minimum time interval is used for instructing the terminal device to determine an end point of a time interval where the time domain resource for detecting the power saving signal is located.

Optionally, in the implementation of the present application, the method further includes: the network device sends an offset, and the offset is used for instructing the terminal device to determine a start point of a time interval where a time domain resource for detecting the power saving signal is located.

Optionally, in the implementation of the present application, the paging resource includes a Paging Occasion (PO) and/or a Paging Frame (PF).

Optionally, in the implementation of the present application, the power saving signal is used for indicating whether the terminal device monitors a paging message at the PO and/or the PF.

Optionally, in the implementation of the present application, a unit of the time interval is at least one of following: a slot, a subframe, a symbol, a millisecond, and a period of a SSB.

A specific example of the method 300 performed by the network device in the implementation may be referred to related description about the network device, such as a base station, in the above method 200, which will not be repeated here for brevity.

In an implementation of the present application, an indication method of power saving information for controlling paging reception is provided, examples of which are as follows.

Example 1: a minimum time interval between a time domain resource of a power saving signal and a PO or PF is configured through a network.

When a UE is in an RRC idle or RRC inactive state, the UE may determine a monitoring occasion for detecting a PDCCH according to its own PF and PO, and perform DRX at other times to achieve a purpose of saving electricity. In order to further achieve the purpose of saving electricity, it is ideal that the UE may know in advance whether there will be a paging message sent to itself when each of its own PO arrives. If not, the UE may not detect a PDCCH in the PO to achieve further electricity saving.

Figure 8:
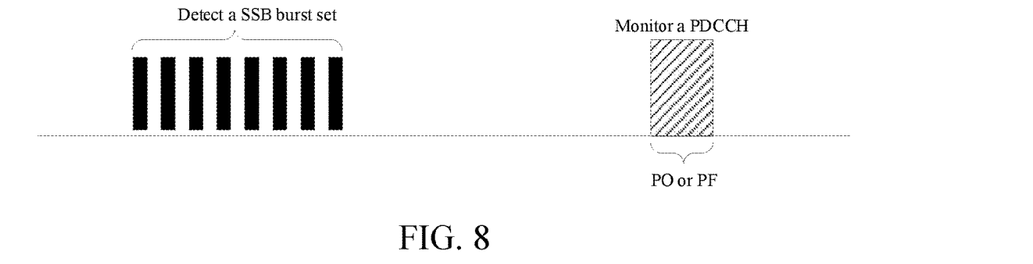
FIG. 8 is a schematic diagram of a UE detecting a Synchronization Signal/Physical Broadcast Channel Block (SSB) before PO for time-frequency synchronization.

In this example, taking a case that a power saving signal is carried through a sequence such as a reference signal sequence or a synchronization signal sequence as an example, a method for determining a position of a time domain resource where the power saving signal is located is provided. Power saving information may be implicitly indicated through a difference of sequences. Whether the UE monitors a paging message in a PF or PO may be indicated through the power saving signal. When the UE is in an RRC idle or RRC inactive state, time-frequency synchronization needs to be performed before a paging message is received. Since the UE in the RRC idle or RRC inactive state is not configured with a UE-specific reference signal such as a CSI-RS, the UE can only perform time-frequency synchronization based on a SSB. Therefore, the UE generally needs to "wake up" in advance to start time-frequency synchronization before its own PO. The UE performs time-frequency synchronization by detecting the SSB before the PO arrives. As for how long the UE needs in advance and how many periods of SSBs the UE needs to detect to achieve time-frequency synchronization, it depends on implementation of the UE, for example, by receiving 1 to 3 SSB burst sets to recover time-frequency synchronization. FIG. 8 illustrates a process of a UE detecting a SSB before a PO for time-frequency synchronization by taking a case that the UE detects a latest SSB burst set before the PO as an example.

In a related technology, a minimum time interval between a time domain resource where the power saving signal is located and DRX ON is determined by a device capability of a terminal. A terminal with a higher processing speed may use a shorter minimum time interval, see value 1 in Table 1 of the above implementation, while a terminal with a lower processing speed may use a longer minimum time interval, see value 2 in Table 1.

Figure 9:
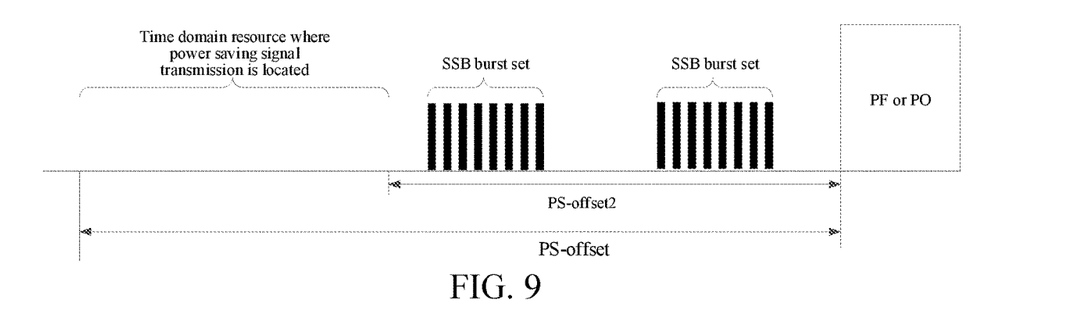
FIG. 9 is a schematic diagram of determining a time interval based on an offset.

In this example, the minimum time interval is configured to a UE through a network. The network may determine the time interval time gap 1 according to a transmission situation of a SSB, such as a period configuration and a timing relationship with a PO, and indicate it to the UE. Upon receiving time interval indication information, the UE determines not to detect a power saving signal within the time interval before start of the PO. For example, as shown in FIG. 9, the network configures offsets PS-offset and PS-offset2. The PS-offset is used for indicating a start point of a time domain resource for the UE to detect a power saving signal (i.e., a start point of a time interval), and the PS-offset 2 is used for indicating an end point of the time domain resource for the UE to detect the power saving signal (i.e., the start point of the time interval), i.e., the power saving signal is not detected within a time interval (i.e., time gap 1) indicated by the PS-offset2. In this time interval, the UE may recover time-frequency synchronization through a SSB, thereby detecting paging when a PO arrives. Of course, if a power saving signal indicates that no paging is detected at the PO, the UE may also not perform recovery of time-frequency synchronization within a time interval. Specifically, a unit of the time interval may be a slot, a subframe, a symbol, a millisecond, or a period of a SSB, etc.

Further, the UE may further determine a time interval time gap=Max {time gap 1, time gap 2} in combination with a minimum time interval time gap 2 determined by a capability of the UE, i.e., take a larger time interval between time gap 1 and time gap 2. It not only satisfies the capability of the UE, but also may configure a longer time interval according to the network, so that the UE has enough time to carry out time-frequency synchronization after receiving the power saving signal.

In this example, the network indicates a time interval in which a power saving signal is not detected before start of a PO or PF, so that the UE may have enough time to perform time-frequency synchronization after receiving the power saving signal, and the network may flexibly configure the time interval according to a transmission situation of a SSB.

Example 2: a minimum time interval between a time domain resource of a power saving signal and a PO or PF is a predefined time interval.

In a related technology, a minimum time interval between a time domain resource where the power saving signal is located and DRX ON is determined by a device capability of a terminal. Referring to Table 1 of the above implementation, this minimum time interval is relatively short. It is difficult for a UE to complete time-frequency synchronization in this time interval.

In this example, a minimum time interval between a time domain resource of a power saving signal and a PO or PF may be predefined. A predefined value may be determined not according to a capability of a UE, but according to a requirement for completing time-frequency synchronization recovery within the time interval. For example, assuming that a period of a SSB is predefined to be 5 ms and a UE needs to receive two SSB burst sets to recover time-frequency synchronization, the minimum time interval may be predefined to be 10 ms. For a sub-carrier space of 15 KHz, it is 10 slots, as shown in Table 3.

TABLE 3

| Minimum time interval | |
|---|---|
| Sub-carrier space (kHz) | Minimum time interval (slots) |
| 15 | 10 |
| 30 | 20 |
| 60 | 40 |
| 120 | 80 |

In this example, the minimum time interval may be independent of a processing capability of the UE, and values may all meet the processing capability of the UE. Only one set of values may be retained in Table 3.

In this example, it uses a predefined way to determine a minimum time interval between a time domain resources of a power saving signal and a PO or PF, which may save signaling overhead and is simple to implement.

Example 3: a minimum time interval between a time domain resource of a power saving signal and a PO or PF is determined according to a predefined rule.

According to a related technology, all SS/PBCH blocks in a SS/PBCH burst set are sent within a time window of 5 ms and are repeatedly sent in a certain period. This period may be configured through a high-layer parameter such as ssb-PeriodicityServingCell, including 5 ms, 10 ms, 20 ms, 40 ms, 80 ms, 160 ms, and so on. This period may be obtained through a system message SIB1.

For example, after the UE obtains a transmission period of a SSB, it may determine a minimum time interval between a time domain resource of a power saving signal and a PO or PF according to the period. Specifically, a relationship between the minimum time interval and the transmission period of the SSB may be predefined. For example, a minimum time interval is predefined to be N times of a transmission period of a SSB, and N may be equal to 1, 2, 3 . . . , depending on a quantity of SSBs that a UE needs to receive to complete time-frequency synchronization recovery within the minimum time interval. In this way, the UE may determine the minimum time interval. Referring to Table 2 in the above implementation, T represents a transmission period of a SSB obtained by the UE from a system message or an RRC signaling, with ms as a unit; N is a predefined coefficient. According to Table 2, minimum time intervals under different sub-carrier spaces are obtained, with a slot as a unit.

In this example, a minimum time interval is determined according to a transmission period of a SSB, which may ensure that a desired quantity of SSBs are used for a UE to recover time-frequency synchronization within a time interval, and has a certain flexibility compared with a predefined minimum time interval.

According to a method of determining a minimum time interval between a PO and a time domain resource of a power saving signal according to an implementation of the present application, a UE may have sufficient time to perform time-frequency synchronization after receiving the power saving signal, thereby correctly receiving paging during the PO.

Figure 10:
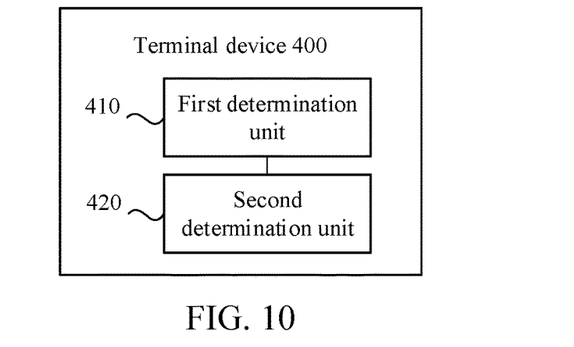
FIG. 10 is a schematic block diagram of a terminal device according to an implementation of the present application.

FIG. 10 is a schematic block diagram of a terminal device 400 according to an implementation of the present application. The terminal device 400 may include: a first determination unit 410, used to determine a time interval between a time domain resource of a power saving signal and a paging resource; and a second determination unit 420, used to determine a time domain resource for detecting the power saving signal based on the time interval.

Optionally, in the implementation of the present application, the first determination unit 410 is further used to receive configuration information including a first time interval.

Optionally, in the implementation of the present application, the first determination unit 410 is further used to determine a minimum time interval between a time domain resource of the power saving signal and a paging resource based on the first time interval.

Optionally, in the implementation of the present application, the first determination unit 410 is further used to determine a second time interval based on a terminal capability; and determine a minimum time interval between a time domain resource of the power saving signal and a paging resource based on a maximum value of the first time interval and the second time interval.

Optionally, in the implementation of the present application, the minimum time interval between the time domain resource of the power saving signal and the paging resource is a predefined value.

Optionally, in the implementation of the present application, the minimum time interval is a predefined value determined based on a requirement for time-frequency synchronization recovery.

Optionally, in the implementation of the present application, the minimum time interval is a predefined value determined based on a sub-carrier space.

Optionally, in the implementation of the present application, the minimum time interval between the time domain resource of the power saving signal and the paging resource is determined based on a predefined rule.

Optionally, in the implementation of the present application, the predefined rule includes calculating and obtaining the minimum time interval using at least one of following parameters: a transmission period of a SSB; a sub-carrier space; a terminal capability; and a transmission period of a reference signal.

Optionally, in the implementation of the present application, the second determination unit 420 is further used to determine an end point of a time interval where the time domain resource for detecting the power saving signal is located based on a minimum time interval between the time domain resource and a paging resource.

Figure 11:
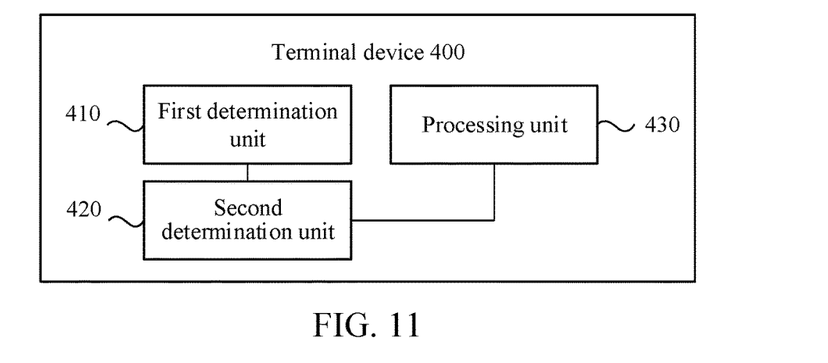
FIG. 11 is a schematic block diagram of a terminal device according to another implementation of the present application.

Optionally, in the implementation of the present application, as shown in FIG. 11, the terminal device further includes: a processing unit 430, used to not to be required to monitor the power saving signal within a minimum time interval between the time domain resource and a paging resource.

Optionally, in the implementation of the present application, the second determination unit 420 is further used to determine a start point of a time interval where a time domain resource for detecting the power saving signal is located based on an offset.

Optionally, in the implementation of the present application, the paging resource includes a Paging Occasion (PO) and/or a Paging Frame (PF).

Optionally, in the implementation of the present application, the power saving signal is used for indicating whether the terminal device monitors a paging message at the PO and/or the PF.

Optionally, in the implementation of the present application, a unit of the time interval is at least one of following: a slot, a subframe, a symbol, a millisecond, and a period of a SSB.

The terminal device 400 of the implementation of the present application can achieve corresponding functions of the terminal device in the aforementioned method implementation.

A flow, a function, an implementation mode, and a beneficial effect corresponding to each module (sub-module, unit, or component, etc.) in the terminal device 400 may be referred to corresponding description in the above method implementation, and will not be repeated here. It should be noted that functions described with respect to various modules (sub-module, unit, or component, etc.) in the terminal device 400 of the implementation of the present application may be achieved by different modules (sub-module, unit, or component, etc.) or by a same module (sub-module, unit, or component, etc.).

Figure 12:
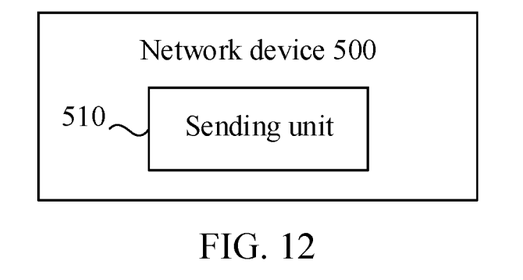
FIG. 12 is a schematic block diagram of a network device according to an implementation of the present application.

FIG. 12 is a schematic block diagram of a network device 500 according to an implementation of the present application. The network device 500 may include: a sending unit 510, used to send a time interval between a time domain resource of a power saving signal and a paging resource; wherein the time interval is used for instructing a terminal device to determine a time domain resource for detecting the power saving signal.

Optionally, in the implementation of the present application, the sending unit 510 is further used to send configuration information including a minimum time interval between the time domain resource of the power saving signal and the paging resource, and the minimum time interval is used for instructing the terminal device to determine an end point of a time interval where the time domain resource for detecting the power saving signal is located.

Optionally, in the implementation of the present application, the sending unit 510 is further used to send an offset, and the offset is used for instructing the terminal device to determine a start point of a time interval where a time domain resource for detecting the power saving signal is located.

Optionally, in the implementation of the present application, the paging resource includes a Paging Occasion (PO) and/or a Paging Frame (PF).

Optionally, in the implementation of the present application, the power saving signal is used for indicating whether the terminal device monitors a paging message at the PO and/or the PF.

Optionally, in the implementation of the present application, a unit of the time interval is at least one of following: a slot, a subframe, a symbol, a millisecond, and a period of a SSB. The network device 500 of the implementation of the present application can achieve corresponding functions of the network device in the aforementioned method implementation. A flow, a function, an implementation mode, and a beneficial effect corresponding to each module (sub-module, unit, or component, etc.) in the network device 500 may be referred to corresponding description in the above method implementation, and will not be repeated here. It should be noted that functions described with respect to various modules (sub-module, unit, or component, etc.) in the network device 500 of the implementation of the present application may be achieved by different modules (sub-module, unit, or component, etc.) or by a same module (sub-module, unit, or component, etc.).

Figure 13:
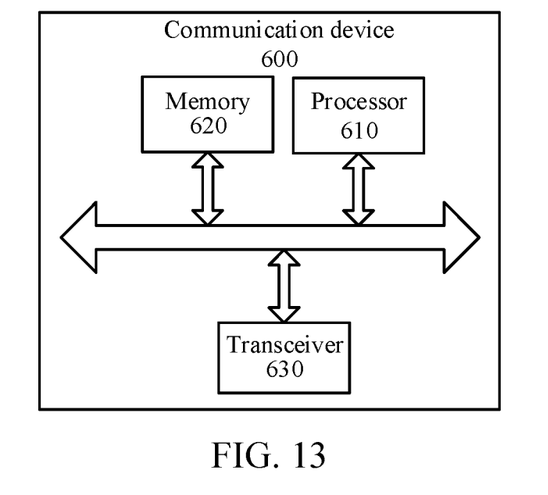
FIG. 13 is a schematic block diagram of a communication device according to an implementation of the present application.

FIG. 13 is a schematic diagram of a structure of a communication device 600 according to an implementation of the present application. The communication device 600 includes a processor 610, and the processor 610 may call and run a computer program from a memory to enable the communication device 600 to implement the method in the implementation of the present application.

Optionally, the communication device 600 may further include a memory 620. The processor 610 may call and run a computer program from the memory 620 to enable the communication device 600 to implement the method in the implementation of the present application.

The memory 620 may be a separate device independent of the processor 610, or may be integrated in the processor 610.

Optionally, the communication device 600 may further include a transceiver 630, and the processor 610 may control the transceiver 630 to communicate with another device. Specifically, information or data may be sent to another device, or information or data sent by another device may be received.

The transceiver 630 may include a transmitter and a receiver. The transceiver 630 may further include antennas, a quantity of which may be one or more.

Optionally, the communication device 600 may specifically be the network device of the implementations of the present application, and the communication device 600 may implement corresponding processes implemented by the network device in various methods of the implementations of the present application, which will not be repeated here for brevity.

Figure 14:
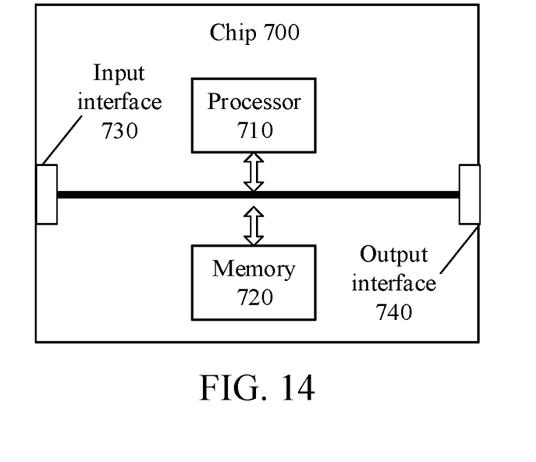
FIG. 14 is a schematic block diagram of a chip according to an implementation of the present application.

Optionally, the communication device 600 may be the terminal device of the implementations of the present application, and the communication device 600 may implement corresponding processes implemented by the terminal device in various methods of the implementations of the present application, which will not be repeated here again for brevity. FIG. 14 is a schematic diagram of a structure of a chip 700 according to an implementation of the present application. The chip 700 includes a processor 710, and the processor 710 may call and run a computer program from a memory to implement the method in the implementation of the present application.

Optionally, the chip 700 may further include a memory 720. The processor 710 may call and run a computer program from the memory 720 to implement a method performed by the terminal device or the network device in the implementations of the present application.

The memory 720 may be a separate device independent of the processor 710, or may be integrated in the processor 710.

Optionally, the chip 700 may further include an input interface 730. The processor 710 may control the input interface 730 to communicate with another device or chip. Specifically, the processor 710 may acquire information or data sent by another device or chip.

Optionally, the chip 700 may further include an output interface 740. The processor 710 may control the output interface 740 to communicate with another device or chip. Specifically, the processor 710 may output information or data to another device or chip.

Optionally, the chip may be applied to the network device in the implementations of the present application, and the chip may implement the corresponding processes implemented by the network device in the various methods of the implementations of the present application, which will not be repeated here for brevity.

Optionally, the chip may be applied to the terminal device in the implementations of the present application, and the chip may implement the corresponding processes implemented by the terminal device in various methods of the implementations of the present application, which will not be repeated here for brevity.

Chips applied to the network device and the terminal device may be a same chip or different chips.

It should be understood that the chip mentioned in the implementations of the present application may also be referred to as a system-level chip, a system chip, a chip system, or a system on chip, etc.

The processor above-mentioned may be a general purpose processor, a digital signal processor (DSP), a field programmable gate array (FPGA), an application specific integrated circuit (ASIC) or other programmable logic devices, a transistor logic device, or a discrete hardware component, etc. The above-mentioned general-purpose processor may be a microprocessor or any conventional processor, etc.

The above-mentioned memory may be a transitory memory or non-transitory memory, or may include both transitory and non-transitory memories. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM).

It should be understood that, the above-mentioned memories are examples for illustration and should not be construed as limitations. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memories in the implementations of the present application are intended to include, but are not limited to, these and any other suitable types of memories.

Figure 15:
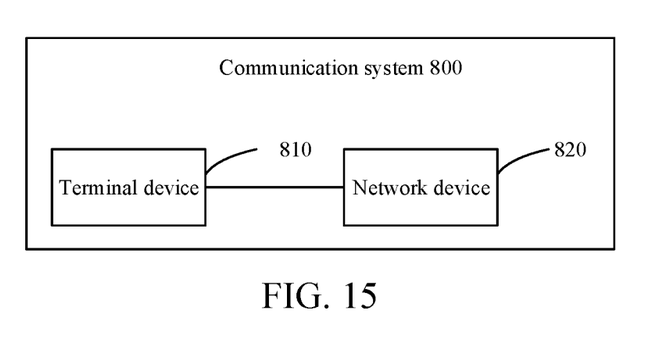
FIG. 15 is a schematic block diagram of a communication system according to an implementation of the present application.

FIG. 15 is a schematic block diagram of a communication system 800 according to an implementation of the present application. The communication system 800 includes a terminal device 810 and a network device 820. The terminal device 810 is used to determine a time interval between a time domain resource of a power saving signal and a paging resource; and determine a time domain resource for detecting the power saving signal based on the time interval. The network device 820 is used to send the time interval between the time domain resource of the power saving signal and the paging resource. The terminal device 810 may be used to implement corresponding functions implemented by the terminal device in the above-mentioned method, and the network device 820 may be used to implement corresponding functions implemented by the network device in the above-mentioned method. Details will not be repeated here for brevity.

The above-mentioned implementations may be implemented in whole or in part through software, hardware, firmware, or any combination thereof. When implemented through software, they may be implemented in whole or in part in a form of a computer program product. The computer program product includes one or more computer instructions. When the computer program instructions are loaded and executed on a computer, flows or functions described in the implementations of the present application are generated in whole or in part. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that can be accessed by a computer or a data storage device such as an integrated server or a data center containing one or more available media. The available media may be magnetic media (e.g., floppy disks, hard disks, magnetic tapes), optical media (e.g., Digital Versatile Disks (DVDs)), or semiconductor media (e.g., Solid State Disks (SSDs)), or the like.

It should be understood that in various implementations of the present application, sequence numbers of the various processes do not imply an order of execution of the various processes, which should be determined by their functions and internal logics, but should not constitute any limitation on implementation processes of the implementations of the present application.

Those skilled in the art may clearly understand that for convenience and conciseness of description, specific working processes of the systems, apparatuses, and units described above may refer to corresponding processes in the aforementioned method implementations, and details will not be repeated here.

The above are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

The invention claimed is:

1. A resource determination method, comprising:
    determining, by a terminal device, a time interval between a time domain resource of a power saving signal and a paging resource, wherein the paging resource comprises a Paging Frame (PF); and
    determining, by the terminal device, a time domain resource for detecting the power saving signal based on the time interval;
    wherein the resource determination method further comprises:
    determining, by the terminal device, a start point of a time interval where the time domain resource for detecting the power saving signal is located based on an offset.

2. The method according to claim 1, wherein the determining, by the terminal device, the time interval between the time domain resource of the power saving signal and the paging resource, comprises:
    receiving, by the terminal device, configuration information, wherein the configuration information comprises a first time interval.

3. The method according to claim 1, wherein the power saving signal is used for indicating whether the terminal device monitors a paging message at the PF.

4. The method according to claim 1, wherein a unit of the time interval is at least one of following: a slot, a subframe, a symbol, a millisecond, and a period of a Synchronization Signal Block (SSB).

5. A resource determination method, comprising:
    sending, by a network device, a time interval between a time domain resource of a power saving signal and a paging resource;
    wherein the time interval is used for instructing a terminal device to determine a time domain resource for detecting the power saving signal, and the paging resource comprises a Paging Frame (PF);
    wherein the resource determination method further comprises:
    sending, by the network device, an offset, wherein the offset is used for instructing the terminal device to determine a start point of a time interval where a time domain resource for detecting the power saving signal is located.

6. The method according to claim 5, wherein the sending, by the network device, the time interval between the time domain resource of the power saving signal and the paging resource, comprises:
    sending, by the network device, configuration information, wherein the configuration information comprises a minimum time interval between the time domain resource of the power saving signal and the paging resource, and the minimum time interval is used for instructing the terminal device to determine an end point of a time interval where the time domain resource for detecting the power saving signal is located.

7. A terminal device, comprising:
    a processor, used to determine a time interval between a time domain resource of a power saving signal and a paging resource, wherein the paging resource comprises a Paging Frame (PF); and
    to determine a time domain resource for detecting the power saving signal based on the time interval;
    wherein the processor is further used to determine, based on an offset, a start point of a time interval where the time domain resource for detecting the power saving signal is located.

8. The terminal device according to claim 7, wherein the processor is further used to receive configuration information, wherein the configuration information comprises a first time interval.

9. The terminal device according to claim 7, wherein the power saving signal is used for indicating whether the terminal device monitors a paging message at the PO and/or the PF.

10. The terminal device according to claim 7, wherein a unit of the time interval is at least one of following: a slot, a subframe, a symbol, a millisecond, and a period of a Synchronization Signal Block (SSB).

11. A network device, comprising:
- a transceiver, used to send a time interval between a time domain resource of a power saving signal and a paging resource, wherein the paging resource comprises a Paging Frame (PF);
- wherein the time interval is used for instructing a terminal device to determine a time domain resource for detecting the power saving signal;
- the transceiver is further used to send an offset, wherein the offset is used for instructing the terminal device to determine a start point of a time interval where a time domain resource for detecting the power saving signal is located.

12. The network device according to claim 11, wherein the transceiver is further used to send configuration information, wherein the configuration information comprises a minimum time interval between the time domain resource of the power saving signal and the paging resource, and the minimum time interval is used for instructing the terminal device to determine an end point of a time interval where the time domain resource for detecting the power saving signal is located.

13. The network device according to claim 11, wherein the power saving signal is used for indicating whether the terminal device monitors a paging message at the PF.

* * * * *